April 25, 1961 G. S. GUNNISON 2,981,393
DEVICE FOR ORIENTING APERTURED PLATES
Filed Jan. 16, 1951 2 Sheets-Sheet 1
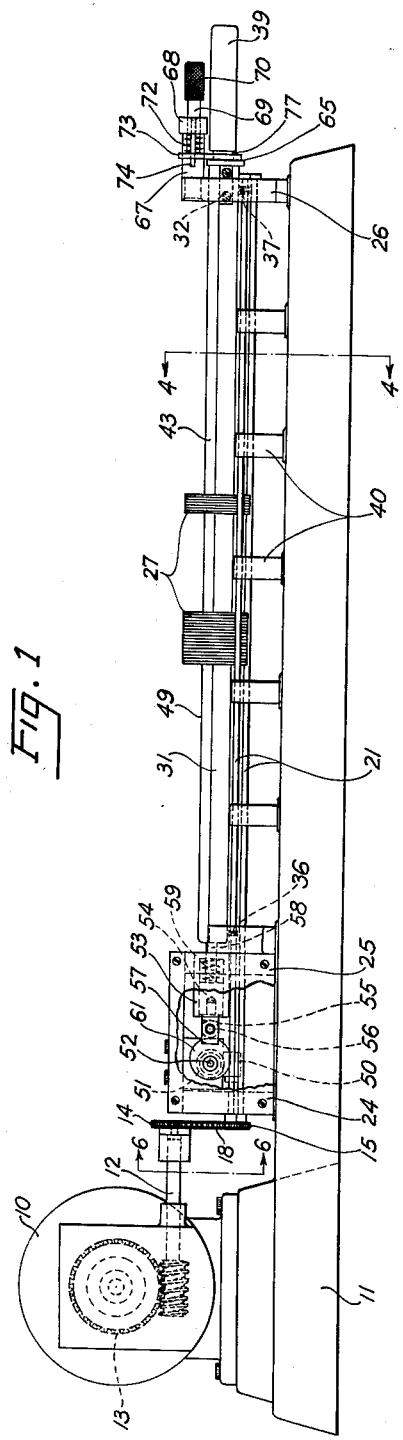
GEORGE S. GUNNISON
INVENTOR
BY
ATTORNEYS April 25, 1961 G. S. GUNNISON 2,981,393
DEVICE FOR ORIENTING APERTURED PLATES
Filed Jan. 16, 1951 2 Sheets-Sheet 2
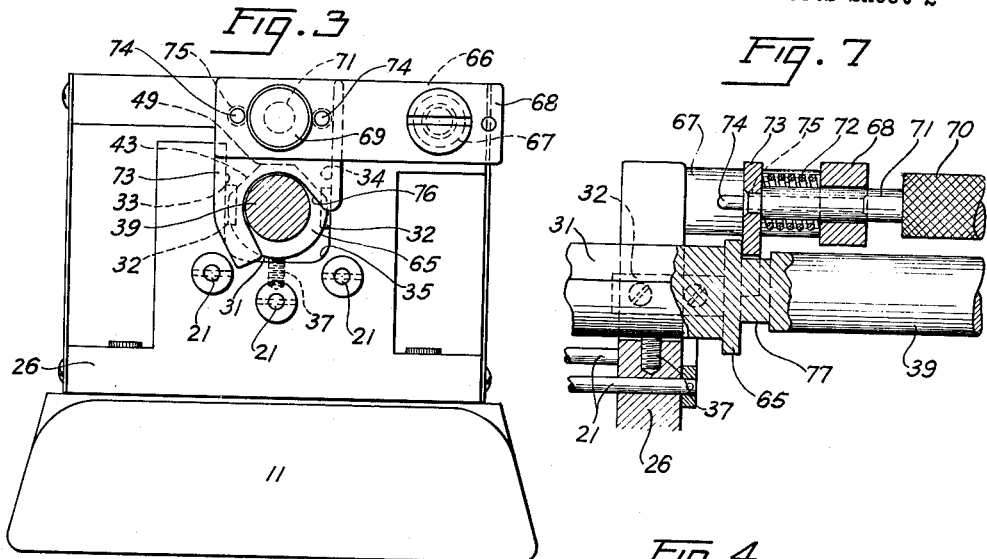
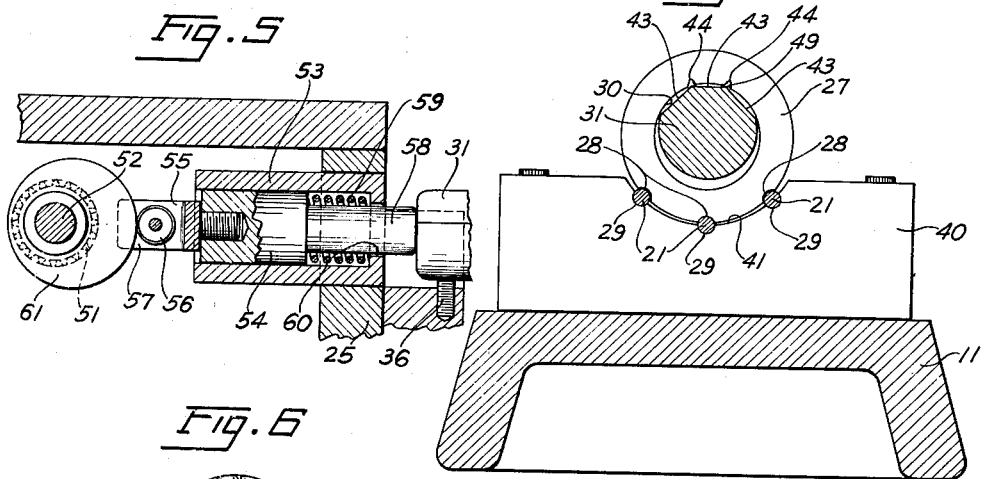
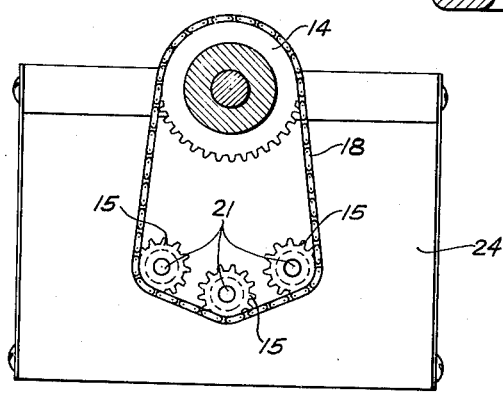
GEORGE S. GUNNISON
INVENTOR
BY *G. D. O'Brien*
ATTORNEYS

United States Patent Office 2,981,393
Patented Apr. 25, 1961

---

2,981,393

DEVICE FOR ORIENTING APERTURED PLATES

George S. Gunnison, Rochester, N.Y., assignor, by mesne assignments, to the United States of America as represented by the Secretary of the Navy Filed Jan. 16, 1951, Ser. No. 206,135

3 Claims. (Cl. 193—43)

This invention relates to the manufacture of small, high voltage batteries and more particularly to apparatus for automatically orienting thin noncircular apertured disc-shaped battery plates on a shaft.

The manufacture of small, high potential batteries requires the assembly of a large number of battery plates in a stack with insulators or spacers positioned between successive plates. Manual assembly of such a battery is time consuming on production runs because of the fragility of the spacers and the large number of pieces included in such a unit. Usually the battery plates must be oriented in the final assembly because of connection lugs and electrolyte level holes provided in the plates which must be kept in alignment.

Automatic loading of noncircular apertured plates onto a mandrel so fitting the apertures as to prevent rotation requires that the plates be preoriented before assembly in the apparatus that will dispense the battery plates. Manual orientation of such plates is time consuming and ill-suited for production runs.

It is an object of this invention to provide apparatus for automatically orienting a stack of thin noncircular apertured battery plates which have been assembled in irregular nonoriented relation on a shaft. It is a further object of this invention to provide apparatus to accomplish this result in much less time than would be required for manual orientation of the plates.

Briefly it may be pointed out that these and other objects may be accomplished by blanking the battery plates with a number of arcuate indentations along their outer circumference, loading the plates in nonoriented relation on a shaft of somewhat smaller diameter than the apertures, assembling the shaft in a device whereby the battery plates rest against rotating driving rods of approximately the same radius as the indentations and spaced along an arc of substantially the same radius as the members with substantially the same angular displacement between the rotating driving rods as between the identations, and imparting linear axial reciprocating motion to the shaft, whereby rotary motion will be transmitted to the plates until the arcuate indentations in the plates are disposed above the rotating driving rods and the plates settle by gravity in desired oriented position.

Other objects and advantages of the invention will become apparent from an examination of the drawings and accompanying description wherein a preferred form of the invention is shown and described.

In the drawings:

Fig. 1 is a front view of one embodiment of the invention as it appears with part of the front of the housing and a support for the plate cam unit cut away.

Fig. 2 is a plan view of the same with part of the cover of the housing for the plate cam unit cut away.

Fig. 3 is an end view of the apparatus shown in Figs. 1 and 2.

Fig. 4 is a vertical section on line 4—4 of Fig. 1.

Fig. 5 is a partial vertical section on line 5—5 of Fig. 2.

Fig. 6 is a vertical section on line 6—6 of Fig. 1.

Fig. 7 is a partial vertical section on line 7—7 of Fig. 2.

As most of the views are sectional and show detailed construction, the drawings will be described together except when a particular view best illustrates the description, in which event reference will be made to the individual drawing.

In a preferred embodiment of the invention illustrated in the drawings a motor 10 rigidly mounted on a cast frame 11 imparts motion to a shaft 12 through a gear reduction train 13 mounted on the frame of the motor 10. A toothed gear 14 secured to the shaft 12 transmits rotary motion to toothed gears 15 (as shown in detail in Fig. 6) through a chain sprocket 18. The toothed gears 15 are pinned to cylindrical driving rods 21 which extend through vertical supports 24, 25, and 26 mounted on the frame 11.

Three arcuate indentations 28 of substantially the same radius as the driving rods 21 are provided along the circumference of the thin noncircular apertured battery plates 27 as shown in Fig. 4. Vertical supports 40 mounted on the frame 11 are formed with arcuate openings 41 along the upper surface thereof of approximately the same radius as the plates 27. Semicircular grooves 29 of substantially the same radius as the driving rods 21 are provided in the surface of the arcuate openings 41 parallel to the axis of the driving rods 21 and separated along the surface of the arcuate openings 41 by substantially the same angular displacement as the indentations 28 in the circumference of the plates 27. The cylindrical driving rods 21 are retained in the semicircular grooves 29 and thus exhibit a contour of approximately semicircular shape above the surface of the arcuate openings 41.

Any desired number of plates 27 can be conveniently assembled on a shaft 31 of somewhat smaller maximum radius than the minimum radius of the apertures 30 in the plates 27. The shaft 31 is adapted to be positioned horizontally in the apparatus embodying the invention with one end of the shaft 31 resting on the support 25 and the opposite end retained in a U-shaped opening 35 formed in the support 26 (shown in Fig. 3). Two flat strips 32 screwed to the shaft 31 diametrically opposite each other and adjacent a shoulder 65 formed on the end of the shaft 31 held on the support 26 abut against the opposing vertical walls 33 and 34 of the U-shaped opening 35 to prevent rotation of the shaft 31. The shaft 31 is supported on set screws 36 and 37 which can be turned to regulate the height thereof above the supports 25 and 26 in which they are fastened to permit variation of the distance of the shaft 31 from the rotating driving rods 21.

To break up any cluster of plates 27 that may have collected together, a shaking action is given to the plates 27 by imparting a linear axial reciprocating motion to the shaft 31. A worm 50 mounted on a rotating driving rod 21 transmits rotary motion through a worm gear 51 to a shaft 52 mounted at right angles to the driving rod 21. A hollow cylinder 53 mounted on support 25 in coaxial relation with the shaft 31 contains a sliding plunger 54 which is spring actuated away from the shaft 31 and toward the motor 10. A roll follower 55 made up of a roller 56 mounted between the fingers of a bifurcated member 57 is fastened in the end of the sliding plunger 54 away from the shaft 31. At the end opposite the roll follower 55, the sliding plunger 54 is formed with a smaller diameter cylindrical shank 58 which extends through a helical spring 59 and an aperture 60 in the end of the hollow cylinder 53 and abuts against the end of the shaft 31. A plate cam 61 mounted on the shaft 52 extends between the fingers of the bifurcated member 57 and abuts against the roller 56. When rotary motion is transmitted to the driving rods 21, the plate cam 61 imparts linear motion to the sliding plunger 54 in a direction away from the motor 10 against the compression in the helical spring 59. The helical spring 59 is compressed between the end of the hollow cylinder 53 and the sliding plunger 54 and returns the sliding plunger 54 toward the motor 10 during the portion of the cycle after the roll follower 55 has reached its farthest position.

A support pin 67 extending horizontally away from the motor 10 is mounted near the upper edge of the "inverted L-shaped" arm 66 of the support 26. A swinging arm 68 pivoted on the end of the support pin 67 is adapted to rotate in a plane perpendicular to the axis of the shaft 31. A turning handle 69 formed with a knurled knob 70 and a smaller diameter cylindrical shank 71 extends horizontally through a clearance hole in the swinging arm 68. After a helical spring 72 is mounted over the end of the shank 71, a flat locking plate 73 is fastened securely to the end of the shank 71. If the turning handle 69 is manually pulled in a direction away from the motor 10, the helical spring 72 will be compressed between the swinging arm 68 and the locking plate 73. Two pins 74 fastened in the swinging arm 68 on opposite sides of the shank 71 extend parallel to the axis of the shaft 31 through clearance holes 75 provided in the locking plate 73. The locking plate 73 thus rotates with the swinging arm 68.

The locking plate 73 is formed with a U-shaped opening 76 (see Fig. 3) which fits snugly over the neck portion 77 formed in the shaft 31 adjacent the shoulder 65. If the turning handle 69 is pulled to compress the helical spring 72, and the swinging arm 68 is rotated counterclockwise to position the turning handle 69 directly above the shaft 31, the U-shaped opening 76 will fit snugly over the neck portion 77 of the shaft 31. If the turning handle 69 is then released, the turning plate 73 will be urged by the helical spring 72 toward the motor 10 and will abut against the shoulder 65 on the shaft 31. Axial linear reciprocating motion can thus be imparted to the shaft 31; the force to move the shaft 31 in a direction away from the motor 10 being transmitted through the shank 58 of the sliding plunger 54, and the force to return the shaft 31 toward the motor 10 being transmitted through the spring-actuated locking plate 73.

Along the exterior periphery and parallel to the axis of the shaft 31 three adjacent flat surfaces 43 are milled encompassing approximately half of the circumference thereof with the middle flat surface 43 of approximately the same width as the separation between two notches 44 formed along the inner circumference of the plates 27. The primary function of the notches 44 is to maintain the plates 27 in properly oriented position on the mandrel on which the final battery stack is assembled. When the shaft 31 is assembled horizontally in the apparatus embodying the invention with the flat strips 32 disposed adjacent the opposing vertical walls 33 and 34, the middle flat surface 43 will be in a horizontal plane at the top of the shaft 31. After the battery plates 27 have rotated until the indentations 28 are disposed adjacent the driving rods 21, the plates 27 settle in desired orientation with the indentations 28 fitting over the rods 21 until the inner surface of the apertured plates 27 rests against the upper flat surface 43.

In the operation of the preferred embodiment of the invention the set screws 36 and 37 are turned until the distance of the bottom of the shaft 31 above the driving rods 21 is greater than the width of the annulus of the battery plates 27 but the width of the annulus plus the diameter of the aperture 30 is greater than the distance between the effective top of the shaft 31 and the driving rods 21. As will be explained later, the effective top of the shaft 31 in the preferred embodiment of the invention is approximately the same as that of a circular shaft of the same radius. The shaft 31 is thus near enough to the driving rods 21 to permit nonoriented plates 27 to rest on the driving rods 21 and to allow oriented plates 27 to settle with the indentations 28 fitting over the driving rods 21 until the inner surface of apertured plates 27 rests against the flat surfaces 43.

Any desired number of apertured plates 27 can be assembled on the shaft 31, which is then positioned in the apparatus embodying the invention. The nonoriented plates 27 rest against the rotating driving rods 21 and rotary motion is transmitted through friction to the plates 27 until the arcuate indentations 28 in the plates 27 are disposed adjacent the driving rods 21. Axial motion in a direction away from the motor 10 is imparted to the shaft 31 by the plate cam 61, and motion to return the shaft 31 toward the motor 10 is transmitted through the spring actuated locking plate 73. Axial linear reciprocating motion is thus applied to the shaft 31 to provide a shaking action to break up any cluster of plates 27 that may have collected together and to supplement the rotary motion of the driving rods 21 tending to bring the plates 27 into orientation. When a plate 27 has rotated until the three arcuate indentations 28 are disposed adjacent the three driving rods 21, the plate is free to fall with the indentations 28 fitting over the rods 21 until the inner surface of the plate 27 strikes against the flat surfaces 43. The notches 44 along the inner circumference of the plates 27 are spaced at a somewhat smaller angular displacement than the angle subtending the middle flat surface 43, so that when the plates 27 settle in desired orientation the notches 44 fit over two ridges 49 formed at the junction of the adjacent flat surfaces 43. The effective top of the shaft 31 in the preferred embodiment of the invention is thus approximately the same as that of a circular shaft having a radius equal to that of a circle circumscribing the flat surfaces 43.

The oriented plates 27 are thus supported on the shaft 31 with the indentations 28 far enough above the rotating rods 21 so that no rotary motion is transmitted to the plates 27 by friction. If a plate 27 has rotated until only two indentations 28 are disposed adjacent rotating driving rods 21, the plate 27 still cannot settle far enough to prevent the outer circumference of the plate 27 from resting against the third driving rod 21, and sufficient rotary motion will be transmitted by friction at the third driving rod 21 to rotate the plate 27 until the desired oriented position is reached.

In operation it was found possible to orient over one thousand battery plates in a few seconds.

While the embodiment of the present invention as herein described constitutes a preferred form, it is to be understood that other forms might be adopted all coming within the scope of the claims which follow:

I claim:

1. In apparatus for orienting thin noncircular apertured disc-shaped members having a number of indentations along the outer circumference thereof, in combination, a noncircular shaft extending through the apertures in the members with the maximum radius of the shaft less than the minimum radius of the apertures whereby the members are free to rotate on the shaft, a number of parallel horizontal driving rods of substantially the same diameter as the width of the indentations and spaced along an arc of substantially the same radius as the members with substantially the same angular displacement between the driving rods as between the indentations, the number of driving rods corresponding to the number of indentations, means for supporting said driving rods, means for supporting the shaft parallel to and at a greater distance above the driving rods than the width of the annulus of the members but with the width of the annulus plus the diameter of the aperture greater than the distance between the effective top of the shaft and the driving rods, means for imparting linear axial reciprocating motion to the shaft, and means for imparting rotary motion to said driving rods whereby rotary motion will be transmitted by friction to said members until said indentations are disposed adjacent to said driving rods and said members settle in desired oriented position.

2. In apparatus for orienting thin noncircular apertured disc-shaped members having a number of indentations along the outer circumference and two notches along the periphery of the inner surface thereof, in combination, a shaft extending through the apertures in the members and formed with three adjacent flat surfaces along the exterior periphery and parallel to the axis thereof, the angle subtending the middle flat surface being somewhat less than the angular displacement between said notches, the maximum radius of the shaft being somewhat less than the minimum radius of the apertures in the members whereby said members are free to rotate on said shaft, a number of parallel horizontal driving rods of substantially the same diameter as the width of the indentations and spaced along an arc of substantially the same radius as the members with substantially the same angular displacement between driving rods as between the indentations, the number of driving rods corresponding to the number of indentations, means for supporting said driving rods, means for supporting the shaft above and parallel to the driving rods with the middle flat surface in a horizontal plane atop the shaft, the shaft being positioned near enough to the driving rods to allow nonoriented members to rest on the driving rods but far enough so that when oriented members settle with the indentations fitting over the driving rods the inner surface of the members strikes against the adjacent flat surfaces to hold the oriented members out of contact with said driving rods, means for imparting linear axial reciprocating motion to the shaft, and means for imparting rotary motion to said driving rods whereby rotary motion will be transmitted by friction to said members until said indentations are disposed adjacent to said driving rods and said members settle until the inner surface of said noncircular apertured members strikes against the flat surfaces with the notches fitting over the ridges formed at the junction of the adjacent flat surfaces.

3. In apparatus for orienting thin noncircular apertured disc-shaped members having a number of arcuate indentations along the outer circumference thereof, in combination, a shaft of somewhat smaller diameter than and extending through the apertures in said members, a number of parallel horizontal rods of substantially the same radius as the indentations and spaced along an arc of substantially the same radius as the members with substantially the same angular displacement between the rods as between the indentations, the number of rods corresponding to the number of indentations, means for supporting said rods, means for supporting the shaft parallel to and at a distance above the rods which will allow nonoriented members to rest against said rods, the number of driving rods corresponding to the number of indentations, means for imparting linear axial reciprocating motion to the shaft, and means for imparting rotary motion to said driving rods whereby rotary motion will be transmitted by friction to said members until said indentations are disposed adjacent said driving rods and said members settle in desired position.

References Cited in the file of this patent

UNITED STATES PATENTS 2,471,402   Bates ---------------- May 31, 1949